(12) United States Patent
Cheng et al.

(10) Patent No.: US 6,811,457 B2
(45) Date of Patent: Nov. 2, 2004

(54) CATHODE PLATE OF A CARBON NANO TUBE FIELD EMISSION DISPLAY AND ITS FABRICATION METHOD

(75) Inventors: Hua-Chi Cheng, Hsinchu Hsien (TW); Cheng-Chung Lee, Taitung (TW); Jane-Hway Liao, Hsinchu Hsien (TW); Yu-Yang Chang, Tainan (TW); Jyh-Rong Sheu, Hsinchu (TW); Jia-Chong Ho, Taipei Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 239 days.

(21) Appl. No.: 10/072,965

(22) Filed: Feb. 9, 2002

(65) Prior Publication Data

US 2003/0151344 A1 Aug. 14, 2003

(51) Int. Cl.[7] .................................................. H01J 9/02
(52) U.S. Cl. ........................................... 445/24; 445/51
(58) Field of Search ....................... 445/24, 51

(56) References Cited

U.S. PATENT DOCUMENTS

| | | | | |
|---|---|---|---|---|
| 5,973,444 A | * | 10/1999 | Xu et al. | 313/309 |
| 5,981,305 A | * | 11/1999 | Hattori | 438/20 |
| 6,250,984 B1 | * | 6/2001 | Jin et al. | 445/51 |
| 6,426,588 B1 | * | 7/2002 | Yanagisawa | 313/422 |
| 6,452,328 B1 | * | 9/2002 | Saito et al. | 313/495 |

* cited by examiner

Primary Examiner—Kenneth J. Ramsey

(57) ABSTRACT

A method for fabricating the cathode plate of a carbon nano tube field emission display uses a photosensitive paste and etchable dielectric material to fabricate the cathode plate. The method combines photolithography process and etching process to fabricate a cathode electrode layer, a dielectric layer, a gate layer, and a carbon nano tube emission layer. Packing this cathode plate structure with a conventional anode plate together can form a carbon nano tube field emission array. The distribution of the electric field is uniform and the alignment at post-process is made easy.

19 Claims, 11 Drawing Sheets

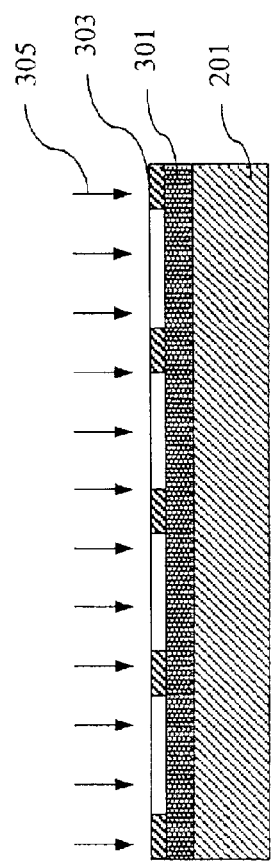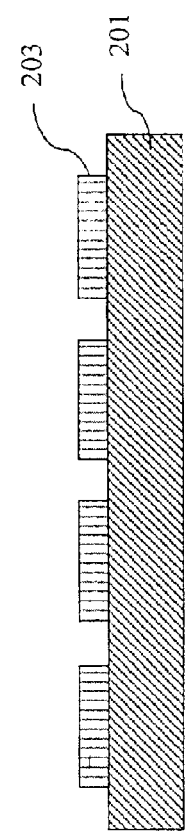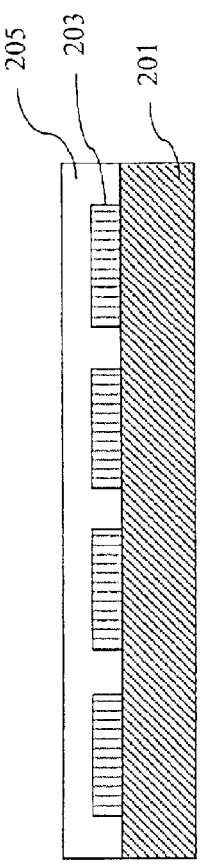

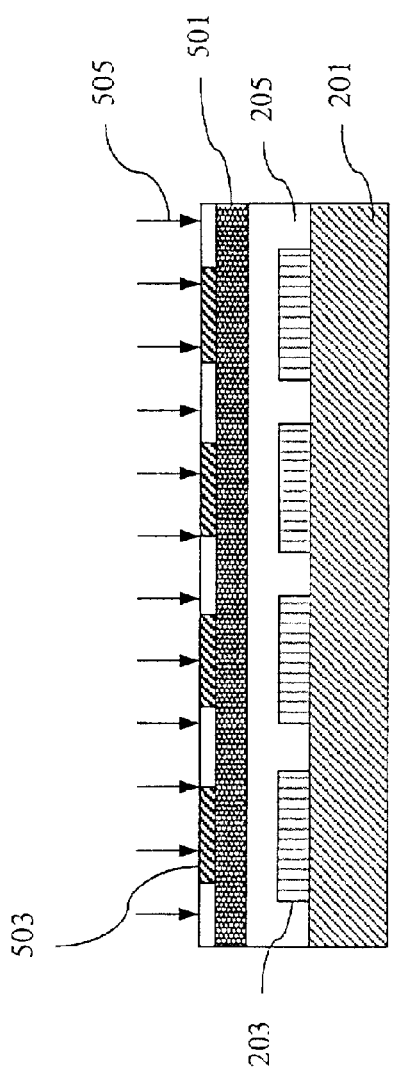
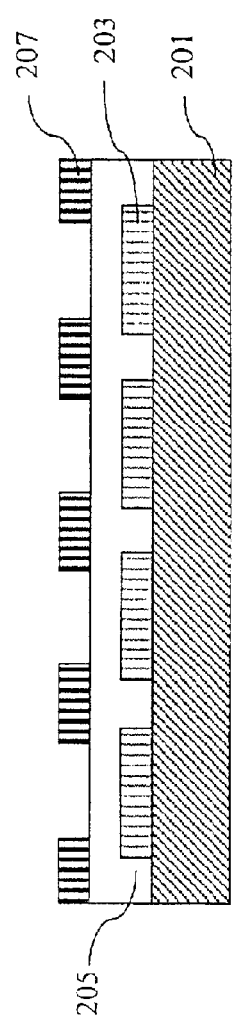
Fig. 5a
Fig. 5b

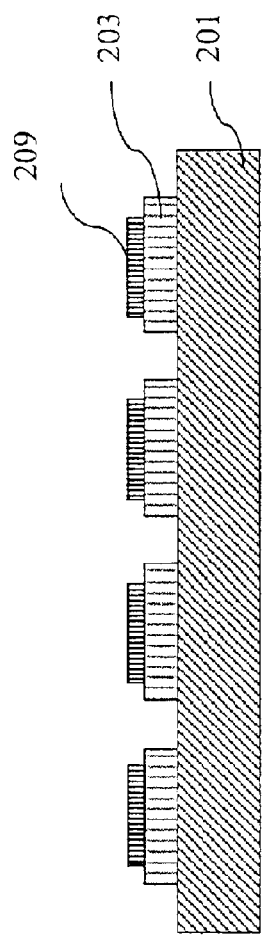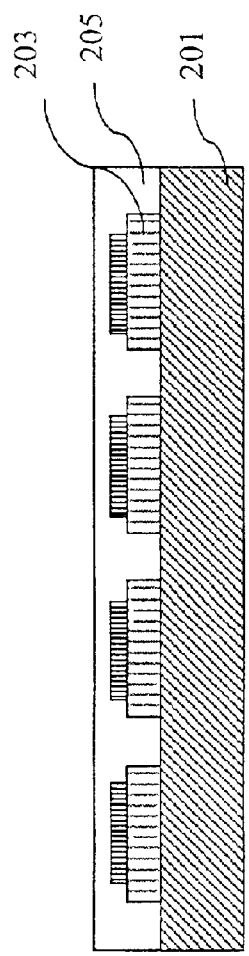

CATHODE PLATE OF A CARBON NANO TUBE FIELD EMISSION DISPLAY AND ITS FABRICATION METHOD

FIELD OF THE INVENTION

The present invention generally relates to a field emission display (FED), and more specifically to a cathode plate of a carbon nano tube (CNT) FED and its fabrication method.

BACKGROUND OF THE INVENTION

Although liquid crystal display (LCD) has become one of the most popular display devices, many researches on different kinds of display technologies are being pursued. One of them is the field emission display that has the potential to replace the conventional liquid crystal display in the display market. Unlike the conventional cathode ray tube (CRT) that uses a hot cathode electron gun, a field emission display uses cold cathode emitter tips as the electron source. When a field emission display is placed in an electric field, cold cathode emitter tips aim at the phosphor-coated anode substrate that is fabricated in the field emission display and emit a bundle of electrons.

FIG. 1 shows a schematic diagram of a conventional field emission display. Electrons, being attracted by an electric field and emitted out of the cold cathode 102 emitter tip 103 on the cathode glass substrate 101, are accelerated by the positive voltage applied to the anode substrate 104 to hit the coated phosphor 106 on the anode 105 and then produce luminescence.

Most conventional cathode plates of field emission displays are fabricated by a screen printing method. In this method, a pre-mixed paste is applied to the surface of a pre-patterned screen and scraped using a scraper to print the pattern onto a substrate. Such process is repeatedly used to stack layers of patterns. The method has some drawbacks. It is difficult to increase the resolution of the printed pattern because of the limitation of the size of the screen mesh. The initial field emission voltage must be high enough to get sufficient brightness for the display. Also, the thickness of the printing film may not be uniform enough and the printed pattern may be inaccurate due to the non-uniform tension of the screen. Therefore, the distribution of the electric field is non-uniform and the alignment at post-process is difficult.

In order to be accepted in the display market, field emission displays must overcome the above-mentioned drawbacks by exploring a new fabrication method. The new fabrication method has to be capable of increasing the resolution of the printed pattern as well as the uniformity of the thickness of the printing film. It must also be able to arrange patterns arbitrarily to increase the function of the display.

SUMMARY OF THE INVENTION

This invention has been made to overcome the above-mentioned drawbacks of conventional field emission displays. The primary object is to provide a fabrication method for the cathode plate of a carbon nano tube field emission display. By combining photolithography process and etching process, the method uses a photosensitive paste and an etchable dielectric material to fabricate the cathode plate of a carbon nano tube field emission display.

According to this invention, the fabrication method for the cathode plate of a carbon nano tube field emission display comprises the preparation of a transparent substrate and the fabrication of a cathode electrode layer, a dielectric layer, a gate layer, and a CNT emission layer. During the fabrication, a transparent substrate having top and bottom surfaces is first prepared. A layer of photosensitive paste is deposited on a surface of the transparent substrate. A pattern is then defined by a photolithography process and sintered to finish a cathode electrode layer.

The whole surface of the cathode electrode layer is deposited with a layer of etchable dielectric material. A layer of photosensitive gate material is further deposited on the dielectric layer. Gate patterns are then printed by a photolithography process and sintered to finish a gate electrode layer. The gate pattern is used as a protecting film to etch a portion of the dielectric layer not covered by the protecting film in a photolithography process and finally a CNT emission layer is filled on the cathode electrode layer to form a cathode plate structure.

In the preferred embodiments of this invention, the transparent substrate, such as a glass substrate, has top and bottom surfaces. The photolithography process includes the definition of a pattern by a photo-mask after pre-bake, photo exposure and development. Before filling the CNT emission layer, the gate pattern is used as a protecting film to etch a portion of the dielectric layer to form a dielectric pattern in a photolithography process. The CNT emission layer can be filled by a photolithography method or an electrical deposition method. In the present invention, following the fabrication of the cathode electrode layer, the CNT emission layer can also be fabricated before the dielectric layer and the gate electrode layer by a screen printing method.

According to this invention, the cathode plate in a carbon nano tube field emission display can increase the resolution of patterns as well as the uniformity of the film thickness. Also, patterns can be arbitrarily arranged. Packing this cathode plate structure and a conventional anode plate together can make a CNT field emission array.

In a preferred embodiment of the invention, the line width of the CNT field emission array can be as small as 30 μm per line space in a photolithography process under the conditions that the exposure energy for the photolithography process is 300–500 mJ, the development is at 20–25° C. room temperature, and the weight percentage (wt %) of the $K_2CO_3$ solution is 0.5–0.7. Comparing with patterns fabricated by conventional screen printing methods, the resolution of the printed pattern is significantly increased by this invention. The resolution of the dielectric layer can be decided during the fabrication process for the gate electrode layer. This reduces the complicated alignment and simplifies the fabrication process. Therefore, the quality of the display is improved.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 3 illustrates the fabrication process for the cathode electrode layer of a cathode plate according to a first embodiment of the invention.

FIG. 4 illustrates the fabrication process for the dielectric layer of a cathode plate according to a first embodiment of the invention.

FIG. 5 illustrates the fabrication process for the gate electrode layer of a cathode plate according to a first embodiment of the invention.

FIGS. 7–10 illustrate the fabrication process for the CNT emission layer, the dielectric layer, and the gate electrode layer of a cathode plate in a carbon nano tube field emission display after the fabrication of a cathode electrode layer as shown in FIG. 3b according to another embodiment of the invention.

DETAILED DESCRIPTION OF THE PREFERRED EMBODIMENTS

Figure 1:
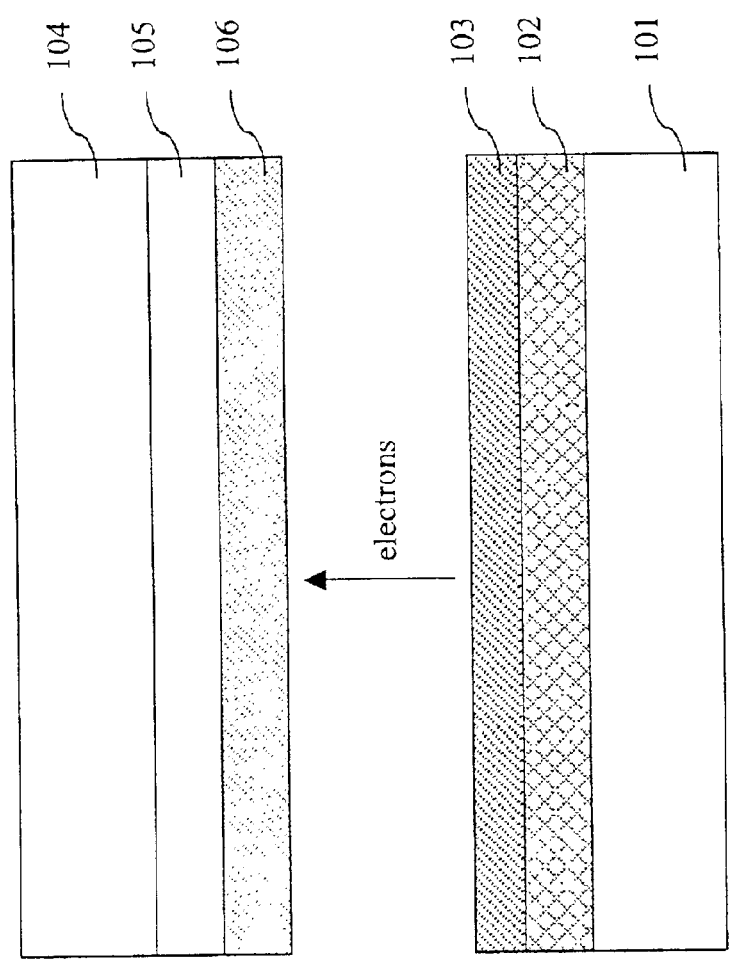
FIG. 1 shows a schematic diagram of a conventional field emission display.
Figure 2A:
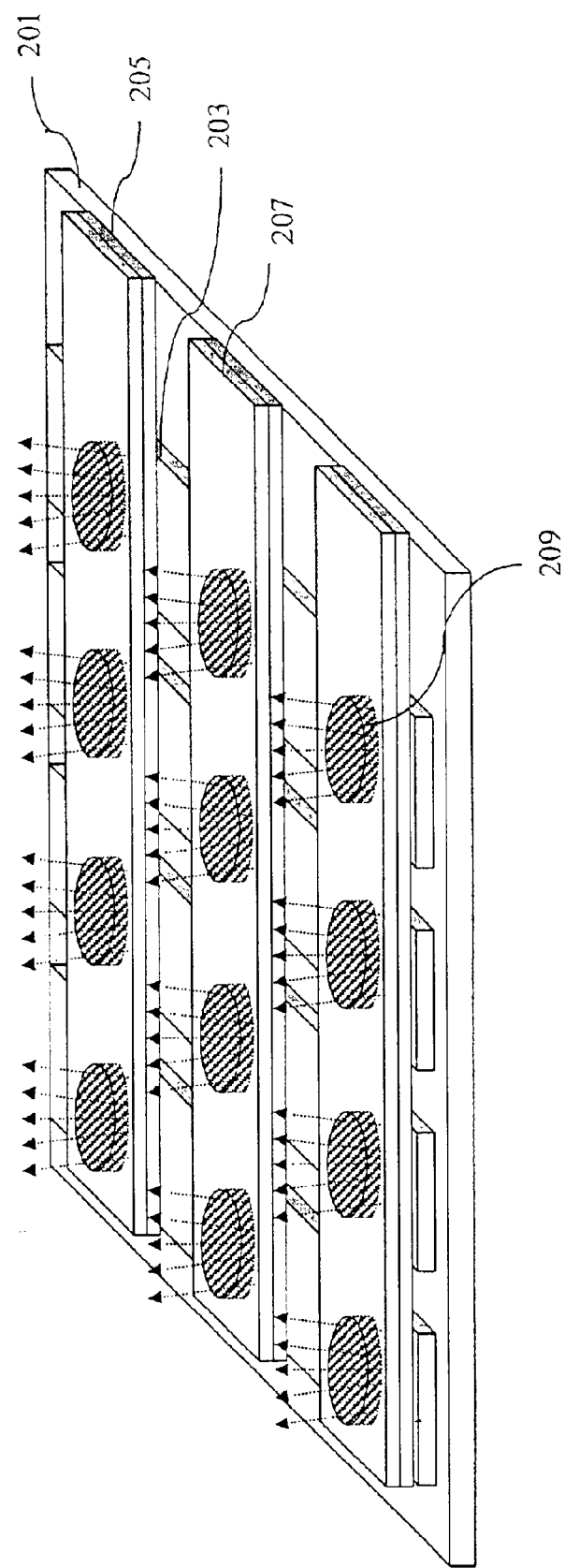
FIG. 2a shows a perspective view of a cathode plate of a carbon nano tube field emission display according to this invention.

FIG. 2a shows a perspective view of the cathode plate of a carbon nano tube field emission display according to this invention. Referring to FIG. 2a, the cathode plate comprises a transparent substrate 201, a cathode electrode layer 203, a dielectric layer 205, a gate electrode layer 207, and a CNT emission layer 209 that are arranged in order from the bottom to the top. The cathode electrode layer 203 comprises multiple parallel electrode strips. The dielectric layer 205 comprises multiple parallel strips of dielectric material. The gate electrode layer 207 comprises multiple parallel electrode strips. Each gate electrode strip is located on the top of a dielectric strip and is perpendicular to cathode electrode strips. There are circular holes on gate electrode strips and dielectric strips at intersections with cathode electrode strips. The circular holes are the field emission regions where the CNT emission layer 209 is filled therein.

According to the invention, the dielectric layer can be composed of a surface film. However, the process needs an extra photolithography process to make the circular holes at every intersection between gate electrode strips and cathode electrode strips.

In a preferred embodiment of this invention, the width of a cathode electrode strip or a dielectric strip is in the range of 30 $\mu$m to 300 $\mu$m and the gap between two parallel strips is in the range of 30 $\mu$m to 50 $\mu$m. The diameter of each circular hole, as shown in FIG. 2a, can be 10 $\mu$m to 50 $\mu$m. The thickness of the cathode electrode layer is in the range of 3.5 $\mu$m to 5.5 $\mu$m. The thickness of the dielectric layer is in the range of 10 $\mu$m to 30 $\mu$m. The thickness of the gate layer is in the range of 3.5 $\mu$m to 5.5 $\mu$m. The thickness of the CNT emission layer is in the range of 3 $\mu$m to 5 $\mu$m.

Figure 2B:
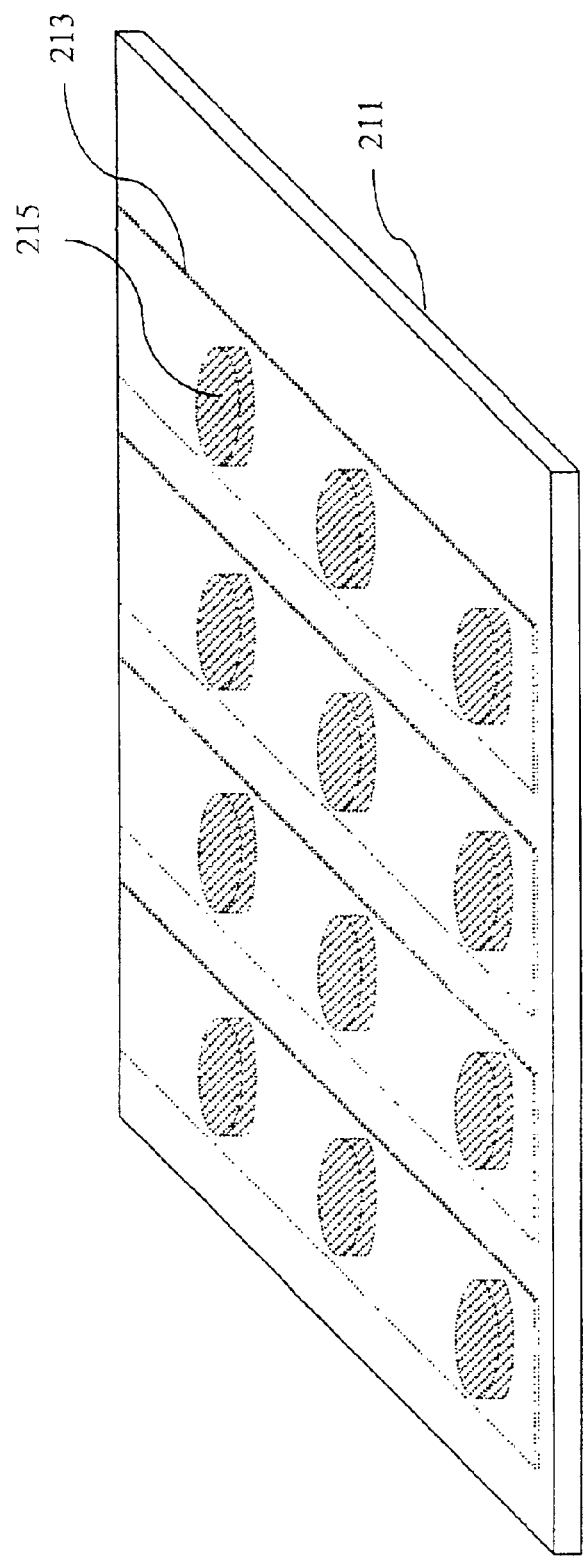
FIG. 2b shows a top view of a conventional anode plate of a field emission display.

A CNT field emission array is made by combining this cathode plate structure with a conventional anode plate of a field emission display and packing them together. FIG. 2b shows a top view of a conventional anode plate of a field emission display. The anode plate comprises a panel 211, a transparent electrode layer 213 and a layer of fluorescent material 215.

With reference to FIGS. 3–6, the following describes in detail, with a preferred embodiment, the fabrication process for the cathode electrode layer, the dielectric layer, the gate electrode layer, and the CNT emission layer of the cathode plate in a carbon nano tube field emission display shown in. FIG. 2a. FIG. 3 illustrates the fabrication process for the cathode electrode layer of the cathode plate according to the invention.

Referring to FIG. 3a, the fabrication process of the cathode electrode layer comprises the steps or preparing a transparent substrate 201 having top and bottom surfaces, depositing a layer of photosensitive paste 301 on a surface of the transparent substrate 201, defining a pattern by photolithography process and sintering to form a cathode electrode layer 203. The photolithography process includes the definition of a pattern by a photo-mask 303 after pre-bake, and the steps of photo exposure 305 and development. FIG. 3b illustrates a cross sectional view of a pattern of the cathode electrode layer 203 after developing.

In the preferred embodiments of the present invention, the photosensitive paste can be made by mixing conductive metal powder and resin with solvent and photosensitive emulsion. The conductive metal powder can be silver (Ag), nickel (Ni), or chromium (Cr). The resin can be trimethyl-pentanediol monoisobutyrate, acrylic resin, or methyl acrylate. The sintering time is about 30 minutes at a temperature between 480° C. to 560° C. in an air atmosphere. The transparent substrate is usually a glass substrate.

After the cathode electrode layer 203 is fabricated, a layer of etchable dielectric material is deposited on the whole surface of the cathode electrode layer 203 and the substrate. The cross sectional view of the dielectric layer 205 is shown in FIG. 4. In the preferred embodiments of the present invention, the dielectric material can be formed by mixing dielectric powder and resin with solvent. The dielectric powder can be $SiO_2$, $Na_2O$, $Li_2O$, $PbO_2$ or $BO_2$. The resin can be trimethylpentanediol monoisobutyrate, acrylic resin, or methyl acrylate.

FIG. 5 illustrates the fabrication process for the gate electrode layer of the cathode plate in a carbon nano tube field emission display according to the invention. A layer of photosensitive gate material 501 is deposited on the whole surface of the dielectric layer 205. After photolithography process and sintering, a gate pattern 207 is formed. In this embodiment, the dielectric layer is sintered to burn away the residual organic material in each layer before depositing the layer of photosensitive gate material 501. The sintering time is about 30 minutes at a temperature between 480° C. to 540° C. in an air atmosphere. The photolithography process includes defining a pattern by a photo-mask 503 after pre-bake, photo exposure 505 and developing. FIG. 5b illustrates a cross sectional view of a pattern of the gate electrode layer 207 after the development.

In the preferred embodiments of the present invention, the material, the sintering time and the temperature used for the gate electrode layer are the same as those used for the cathode electrode layer. The deposition method includes spin, roller and screen-printing. The solvent for all layers mentioned-above can be the combination of carboxylic acid, aliphatic acid, ethyl 4-dimethylaminobenzoate, and 2,2-dimethoxy-2-phenyl acetophenone. The solid content of the paste is about 50–65%.

Figure 6A:
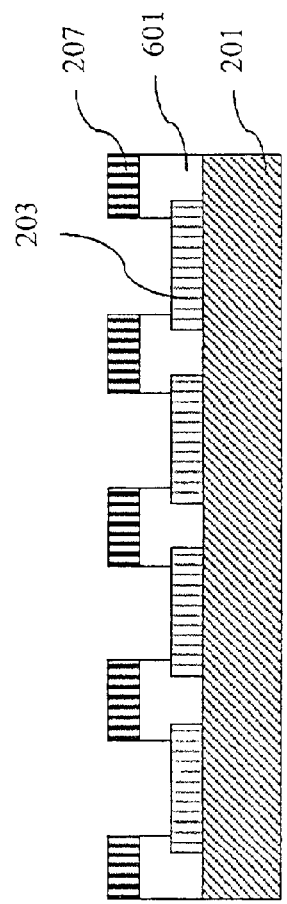
FIG. 6 illustrates the fabrication process for the CNT emission layer of a cathode plate according to a first embodiment of the invention.

FIG. 6 illustrates the fabrication process for the CNT emission layer of the cathode plate in a carbon nano tube field emission display according to the invention. The gate pattern 207 is used as a protecting film to etch a portion of the dielectric layer not covered by the protecting film in a photolithography process. Finally, the CNT emission layer 209 is deposited on the cathode electrode layer 203 to form a cathode plate structure. In this embodiment, the etching process etches the dielectric layer 205 to form a dielectric pattern 601. The residual organic material in each layer is burn away by sintering. The cross sectional view of the structure after sintering is shown in FIG. 6a.

Figure 6B:
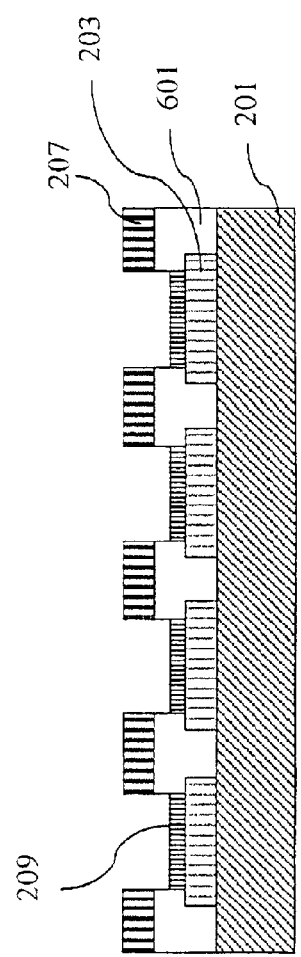

According to this invention, the CNT emission layer 209 can be fabricated on the cathode electrode layer 203 by a photolithography method or an electrical deposition method. FIG. 6b illustrates a cross sectional view of a complete cathode plate structure. The following describes these two methods in more detail.

The fabrication of the CNT emission layer using a photolithography method is accomplished by depositing a layer of photosensitive CNT paste on the surface of the cathode plate shown in FIG. 6a and define a pattern for the CNT emission layer as shown in FIG. 6b by alignment and exposure. It is then sintered for 30 minutes in a 480° C. to 500° C. oven in an nitrogen atmosphere. The photosensitive CNT paste can be made by mixing positive or negative photoresist with CNT powder of 5–30 weight percentage and silver (Ag) powder of 5–30 weight percentage.

The fabrication of the CNT emission layer using an electrical deposition method comprises the steps of depositing a layer of positive or negative photoresist on the surface of the cathode electrode layer 203 and the gate electrode layer 207 shown in FIG. 6a, and using a mask to define a photoresist pattern by alignment and exposure. After the photoresist pattern is formed above the gate pattern 207, the CNT emission layer is then formed by electrically depositing a CNT paste into the field emission region on the cathode electrode pattern 203 for 30–60 seconds at 35 volts, and sintering for 30 minutes in a 480° C. to 500° C. oven at a nitrogen atmosphere.

The CNT paste for the electrical deposition method can be made by mixing CNT powder of 3–50 weight percentage and water ($H_2O$) with a dispersant, such as carboxyl methyl cellulose (CMC) of 0.02–0.2 grams per liter.

In addition to the fabrication process shown in FIGS. 3—6, the following describes the fabrication process for a cathode plate of the invention with another preferred embodiment. The fabrication process comprises the preparation of a transparent substrate and the fabrication of the cathode electrode layer, the CNT emission layer, the dielectric layer, and the gate electrode layer in sequence. In other words, following the fabrication of the cathode electrode layer shown in FIG. 3b, the CNT emission layer is fabricated before the dielectric layer and the gate electrode layer, as shown in FIGS. 7–10.

Figure 9A:
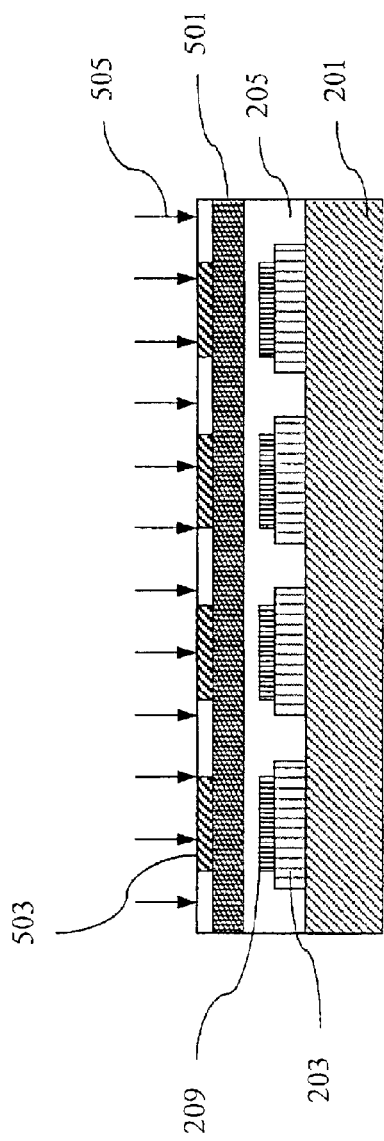
Figure 9B:
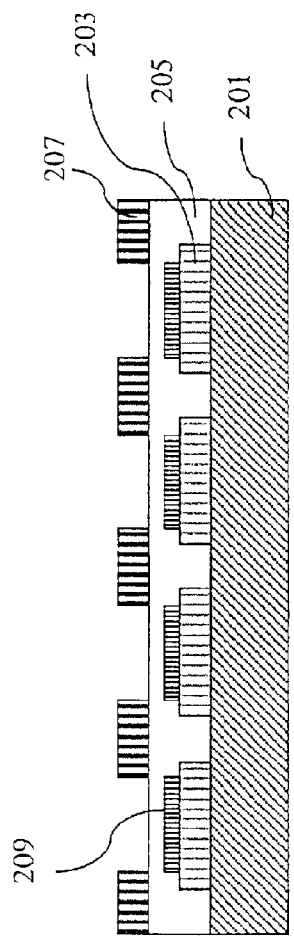
Figure 10:
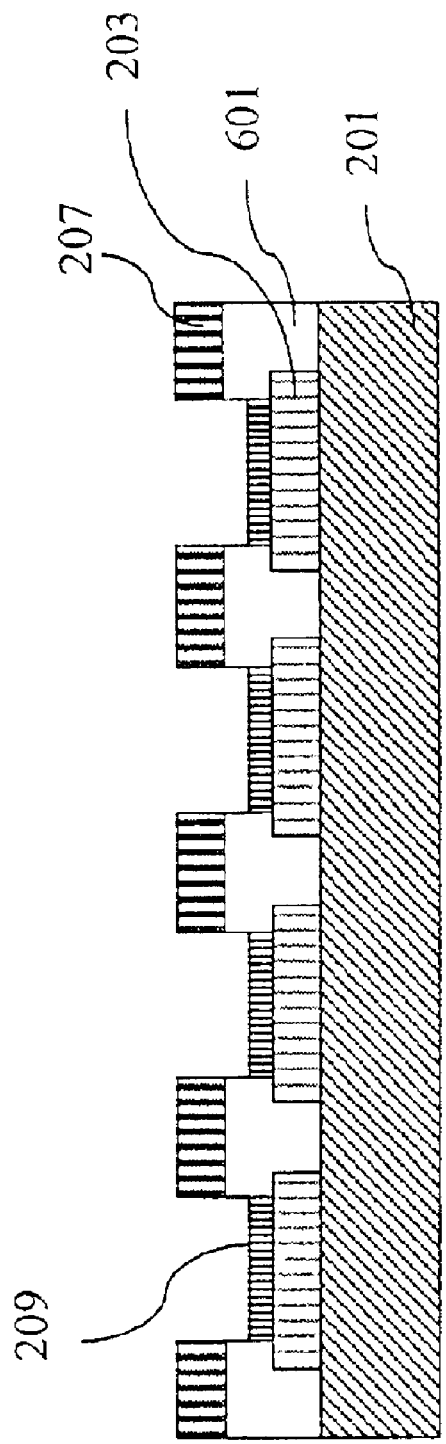

After the fabrication of the cathode electrode layer 203 shown in FIG. 3b, a CNT emission layer 209 is printed on the pattern of the cathode electrode layer 203 by a screen printing method, as shown in FIG. 7. Then a layer of etchable dielectric material is deposited on the whole surface of the device as a dielectric layer 205, as shown in FIG. 8. The fabrication process for the gate electrode layer shown in FIGS. 9a–9b is the same as that shown in FIGS. 5a–5b. After developing the gate electrode layer 207 shown in FIG. 9b, the gate pattern 207 is used as a protecting film to etch a dielectric layer 205 and form a dielectric pattern 601. Then the residual organic material in each layer is burn away and the cathode plate structure is completed, as shown in FIG. 10.

The resolution of the dielectric layer can be decided during the fabrication process for the gate electrode layer. Accordingly, this invention reduces the complicated alignment and simplifies the fabrication process. It also increases the resolution of patterns as well as the uniformity of the film thickness. Patterns can be arbitrarily arranged too.

Figure 11:
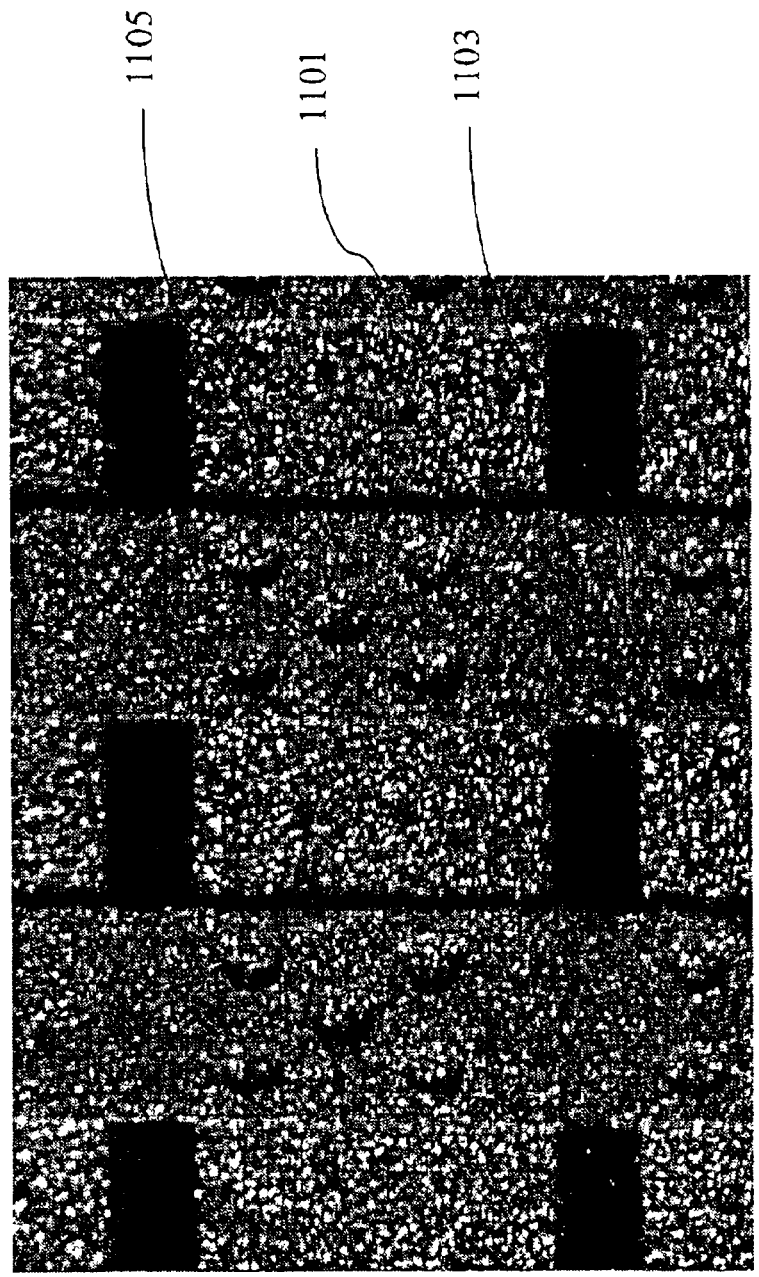
FIG. 11 shows an enlarged picture of the cathode electrode layer and the gate electrode layer of a cathode plate according to the invention.

FIG. 11 shows an enlarged picture of the cathode electrode layer and the gate electrode layer of the cathode plate in a carbon nano tube field emission display according to the invention. Referring to FIG. 11, the horizontal strips are the cathode electrode patterns 1101, the vertical strips are the gate electrode patterns 1103, and the CNT emission layer 1105 is filled inside the circular holes of diameter 50 $\mu$m. The dielectric layer (not shown) is under the gate electrode patterns 1103. The CNT emission layer 1105 is filled by a photolithography method. The line width of the CNT field emission array can be as small as 30 $\mu$m per line space in a photolithography process under the conditions that the exposure energy for the photolithography process is 300–500 mJ, the development is at 20–25° C. room temperature, and the weight percentage of the $K_2CO_3$ solution is 0.5–0.7.

Figure 12:
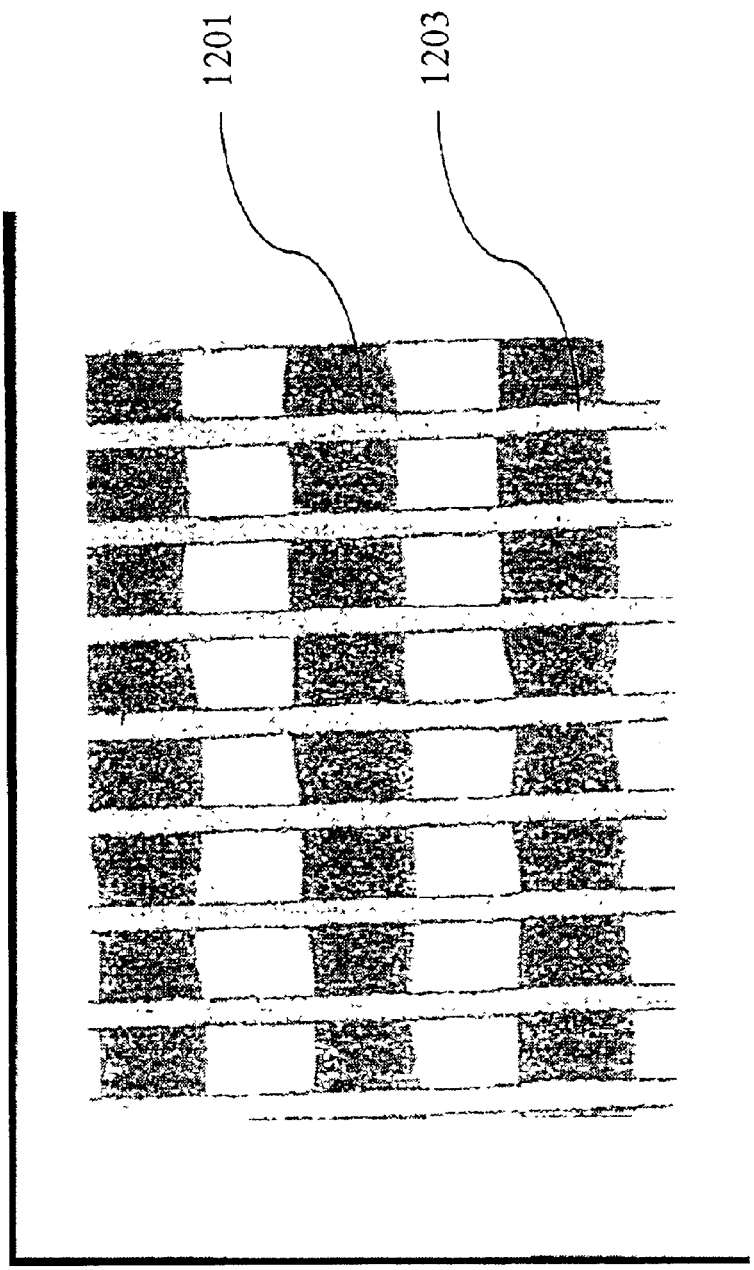
FIG. 12 shows an enlarged picture of cathode electrode patterns fabricated by a conventional screen printing method as well as by a photolithography method of this invention.

FIG. 12 shows an enlarged picture of cathode electrode patterns fabricated by a conventional screen printing method as well as by the photolithography method of this invention. Referring to FIG. 12, the strip width of the cathode electrode patterns 1201 (horizontal coarse lines) fabricated by a conventional screen printing method is greater than 100 $\mu$m. The strip width of the cathode electrode patterns 1203 (vertical thin lines) fabricated by the photolithography method of this invention is about 30 $\mu$m. As shown in FIG. 12, the resolution of the printed pattern is significantly increased by this invention. Therefore, the quality of the display is improved.

In summary, this invention uses photosensitive paste and etchable dielectric material and combines photolithography process and etching process to fabricate the cathode plate of a carbon nano tube field emission display. It overcomes the drawback of conventional screen printing methods in which the resolution of the printed pattern is difficult to increase. The advantages of this invention also include simple fabrication process, uniform thickness of the film, and accurate printed patterns. Also, the distribution of the electric field is uniform and the alignment at the post-process is not difficult.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for fabricating a cathode plate of a carbon nano tube field emission display, said method comprising the steps of:
    (a) preparing a transparent substrate;
    (b) depositing a layer of photosensitive paste on said transparent substrate, patterning said layer of photosensitive paste using a photolithography process, and sintering to form a cathode electrode layer;
    (c) depositing a layer of etchable dielectric material on said cathode electrode layer and said transparent substrate;
    (d) depositing a layer of photosensitive gate material on said layer of dielectric material, patterning said layer of photosensitive gate material using a photolithography process, and sintering to form a gate electrode layer;
    (e) using said gate electrode layer as a protecting film to pattern said layer of dielectric material with a photolithography process to form field emission regions above said cathode electrode layer; and (f) filling said field emission regions with a carbon nano tube emission layer on said cathode electrode layer.

2. The method for fabricating a cathode plate of a carbon nano tube field emission display as claimed in claim 1, wherein said photosensitive paste in step (b) is made by mixing conductive metal powder and resin with solvent and photosensitive emulsion.

3. The method for fabricating a cathode plate of a carbon nano tube field emission display as claimed in claim 1, wherein said photosensitive gate material in step (d) is made by mixing conductive metal powder and resin with solvent and photosensitive emulsion.

4. The method for fabricating a cathode plate of a carbon nano tube field emission display as claimed in claim 1, wherein said dielectric material in step (c) is made by mixing dielectric powder chosen from the group of $SiO_2$, $Na_2O$, $Li_2O$, $PbO_2$ and $BO_2$, and resin with solvent.

5. The method for fabricating a cathode plate of a carbon nano tube field emission display as claimed in claim 1, wherein sintering in step (b) is processed for about 30 minutes at a temperature in the range of 480° C. to 560° C. in an air atmosphere.

6. The method for fabricating a cathode plate of a carbon nano tube field emission display as claimed in claim 1, wherein sintering in step (d) is processed for about 30 minutes at a temperature in the range of 480° C. to 560° C. in an air atmosphere.

7. The method for fabricating a cathode plate of a carbon nano tube field emission display as claimed in claim 1, further comprising a step of sintering said layer of dielectric material to burn away residual organic materials in each layer after depositing said layer of etchable dielectric material in step (c).

8. The method for fabricating a cathode plate of a carbon nano tube field emission display as claimed in claim 7, wherein said sintering step in step (c) is processed for about 30 minutes at a temperature in the range of 480° C. to 540° C. in an air atmosphere.

9. The method for fabricating a cathode plate of a carbon nano tube field emission display as claimed in claim 1, wherein step (f) further includes a step of sintering to burn away residual organic materials in each layer before filling said field emission regions with a carbon nano tube emission layer.

10. The method for fabricating a cathode plate of a carbon nano tube field emission display as claimed in claim 1, wherein each photolithography process includes the steps of defining a pattern by a photo-mask after pre-bake, photo exposure and developing.

11. The method for fabricating a cathode plate of a carbon nano tube field emission display as claimed in claim 1, wherein said carbon nano tube emission layer in step (f) is filled on said cathode electrode layer by an electrical deposition method.

12. The method for fabricating a cathode plate of a carbon nano tube field emission display as claimed in claim 11, wherein said carbon nano tube paste is made by mixing a dispersant with carbon nano tube powder of 3–50 weight percentage and solvent.

13. The method for fabricating a cathode plate of a carbon nano tube field emission display as claimed in claim 1, wherein said carbon nano tube emission layer in step (f) is filled by an electrical deposition method comprising the steps of forming a photoresist layer above said gate electrode layer, depositing a carbon nano tube paste into said field emission regions electrically, and sintering to remove residual organic materials in each layer of said cathode plate in a high temperature oven.

14. The method for fabricating, a cathode plate of a carbon nano tube field emission display as claimed in claim 13, wherein said sintering step after depositing said carbon nano tube paste into said field emission regions is processed for about 30 minutes at a temperature in the range of 480° C. to 500° C. in a nitrogen atmosphere.

15. The method for fabricating a cathode plate of a carbon nano tube field emission display as claimed in claim 1, wherein said carbon nano tube emission layer in step (f) is filled on said cathode electrode layer by a photolithography method.

16. The method for fabricating a cathode plate of a carbon nano tube field emission display as claimed in claim 15, wherein said photosensitive carbon nano tube paste is made by mixing photoresist with carbon nano tube powder of 5–30 weight percentage and silver powder of 5–30 weight percentage.

17. The method for fabricating a cathode plate of a carbon nano tube field emission display as claimed in claim 1, wherein said carbon nano tube emission layer in step (f) is filled by a photolithography method comprising the steps of depositing a layer of photosensitive carbon nano tube paste on the surface of said cathode plate, defining a pattern for said carbon nano tube emission layer by alignment and exposure, and sintering to remove residual organic materials in each layer of said cathode plate in a high temperature oven.

18. The method for fabricating a cathode plate of a carbon nano tube field emission display as claimed in claim 17, wherein said sintering step after depositing said carbon nano tube paste into said field emission regions is processed for about 30 minutes at a temperature in the range of 480° C. to 500° C. in a nitrogen atmosphere.

19. A method for fabricating a cathode plate of a carbon nano tube field emission display, said method comprising the steps of:

(a) providing a transparent substrate;

(b) depositing a layer of photosensitive paste on said transparent substrate, patterning said layer of photosensitive paste using a photolithography process, and sintering to form a cathode electrode layer;

(c) printing a carbon nano tube emission layer on said cathode electrode layer by a screen printing method;

(d) depositing a layer of etchable dielectric material on said carbon nano tube emission layer, said cathode electrode layer and said transparent substrate;

(e) depositing a layer of photosensitive gate material on said layer of dielectric material, patterning said layer of photosensitive gate material using a photolithography process, and sintering to form a gate electrode layer; and (f) using said gate electrode layer as a protecting film to etch said layer of dielectric material with a photolithography process and expose said carbon nano tube emission layer above said cathode electrode layer, and sintering to remove residual organic materials in each layer.

* * * * *